G. H. BARBOUR.
ROLLING MILL.
APPLICATION FILED NOV. 13, 1909.
1,078,240. Patented Nov. 11, 1913.
5 SHEETS—SHEET 4.
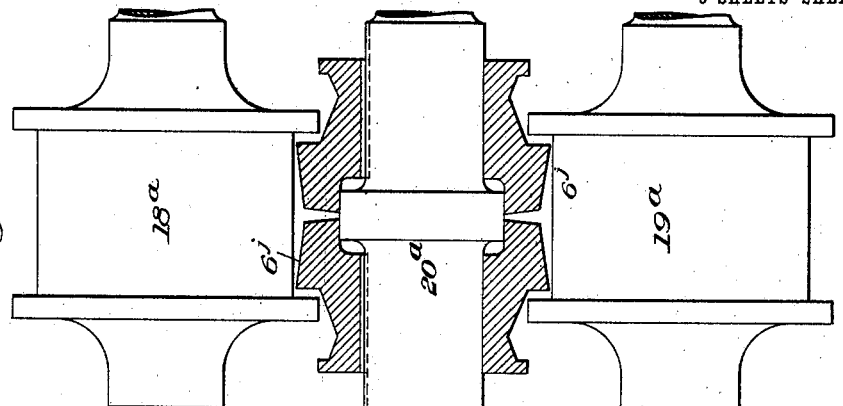
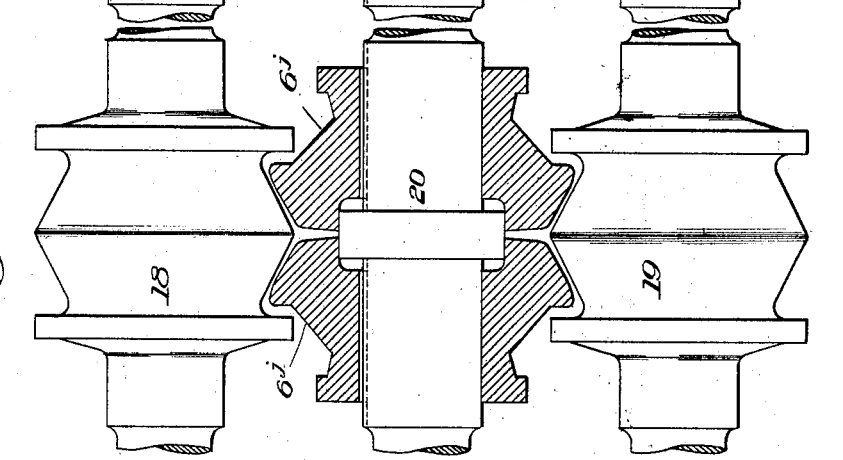
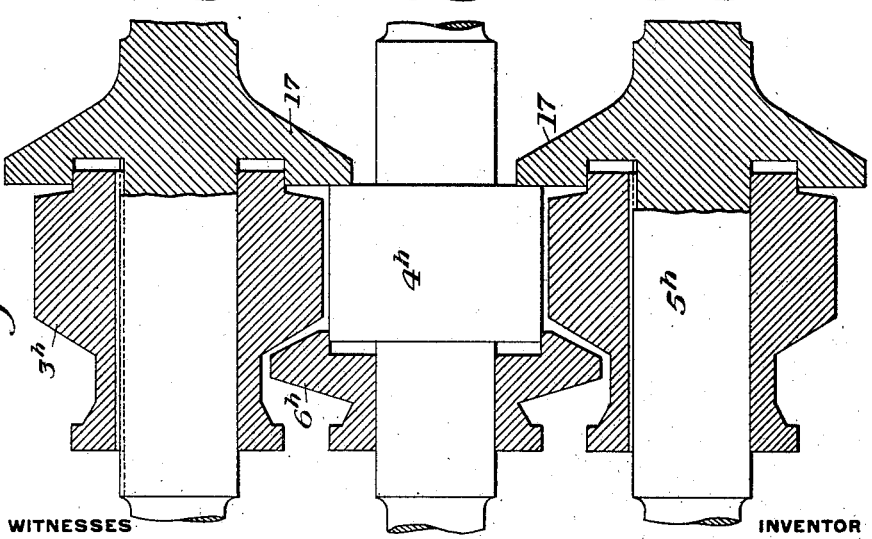

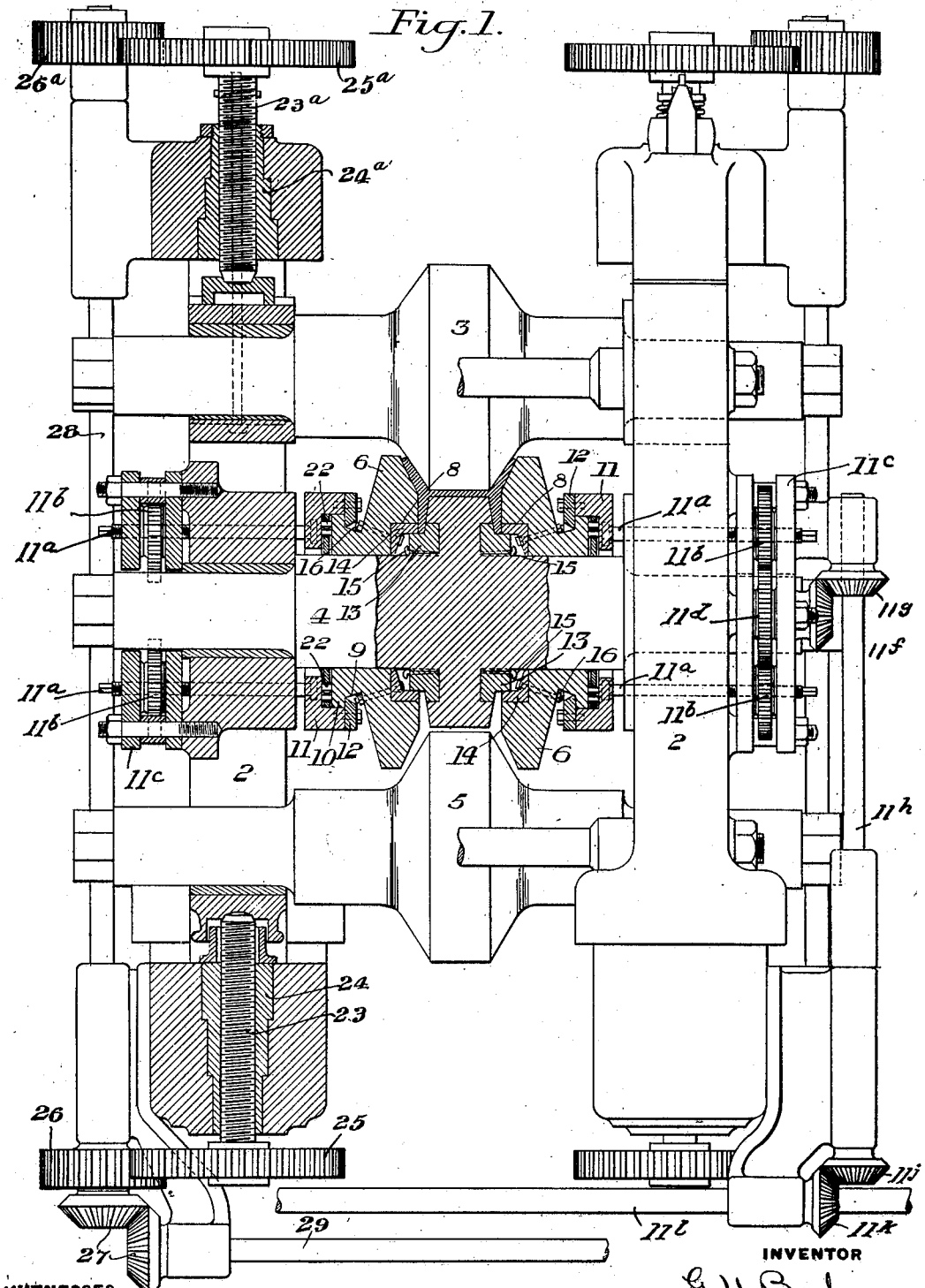

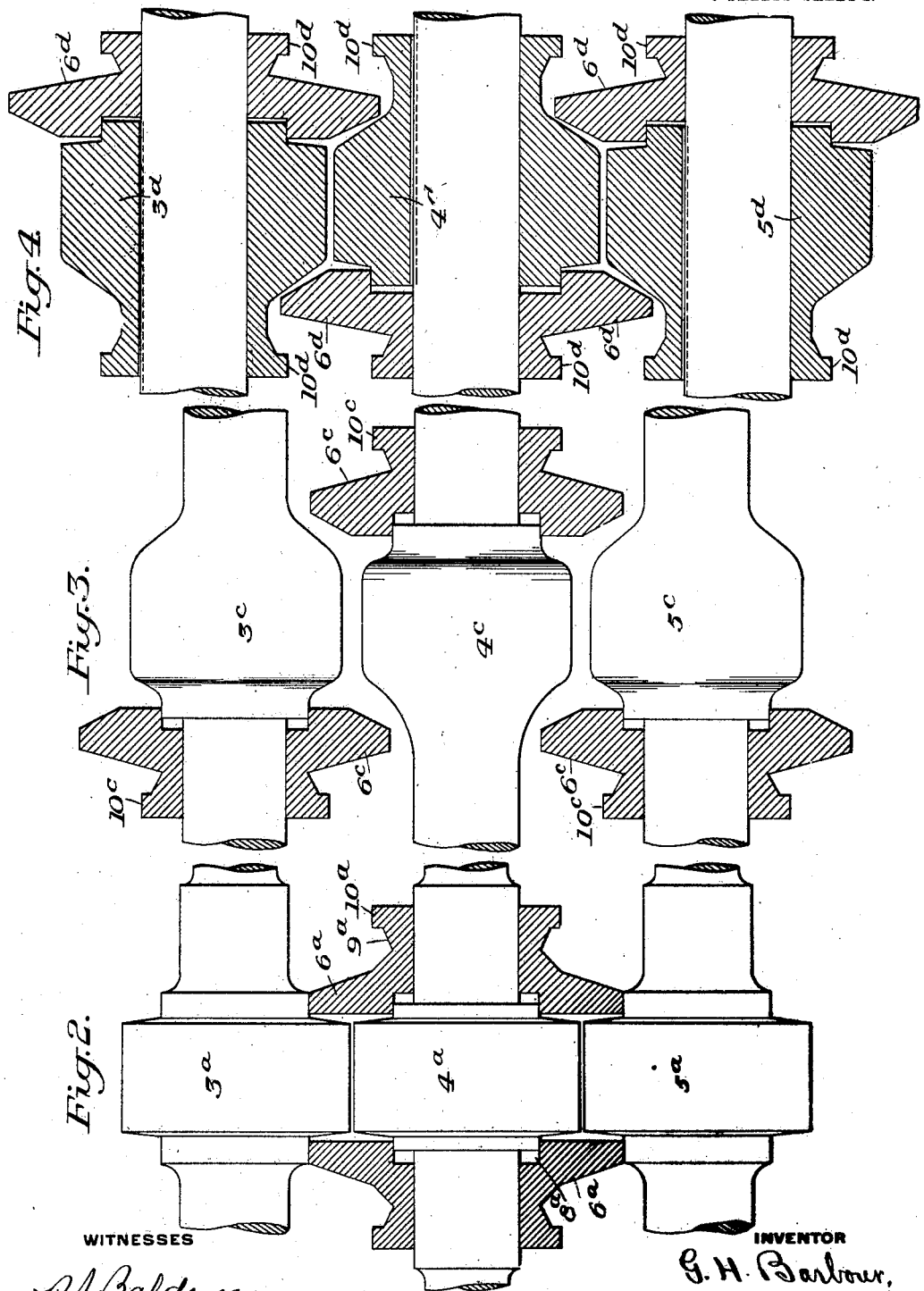

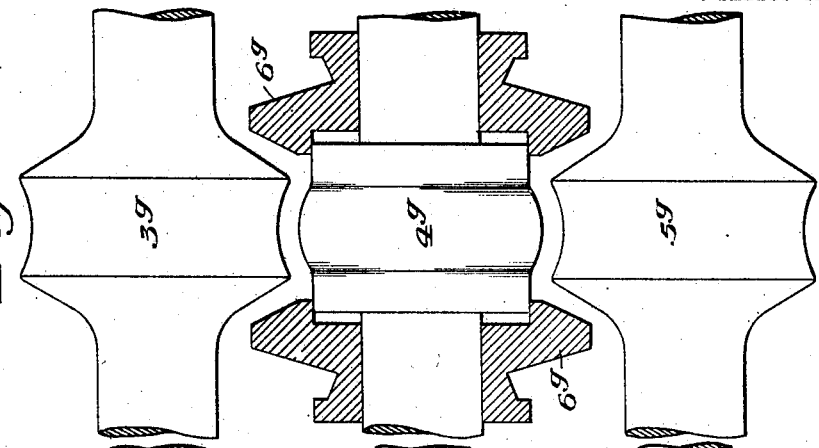
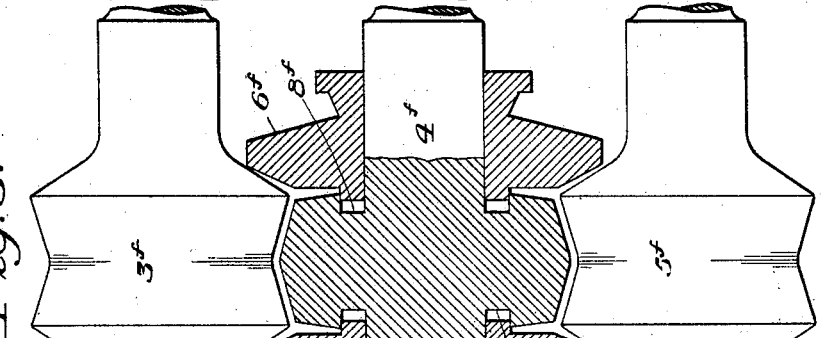
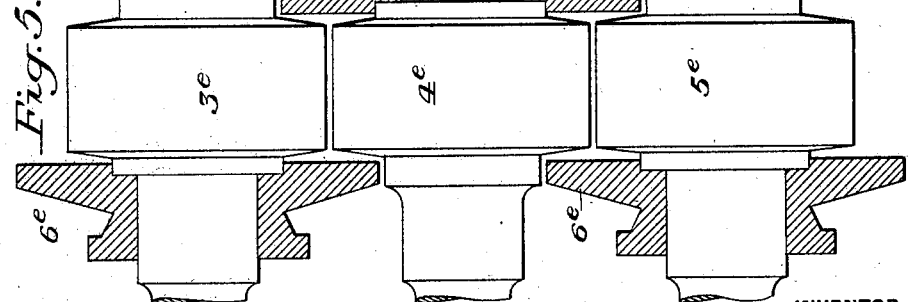

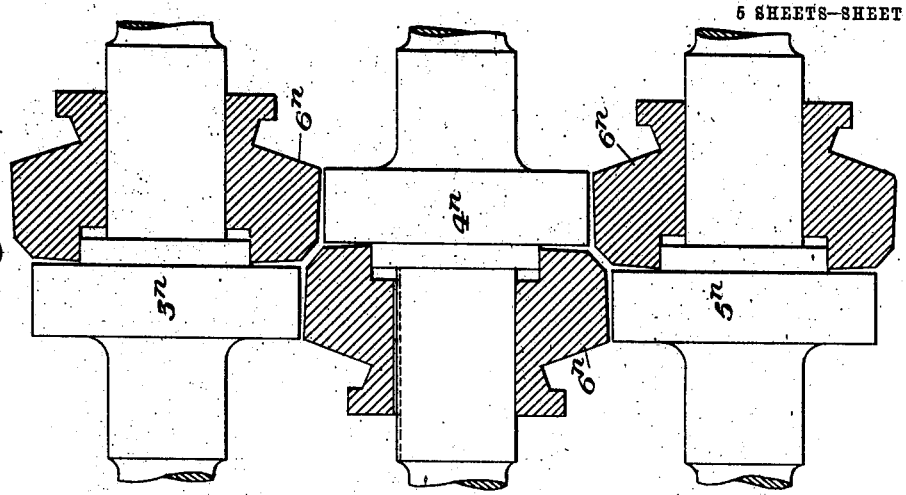
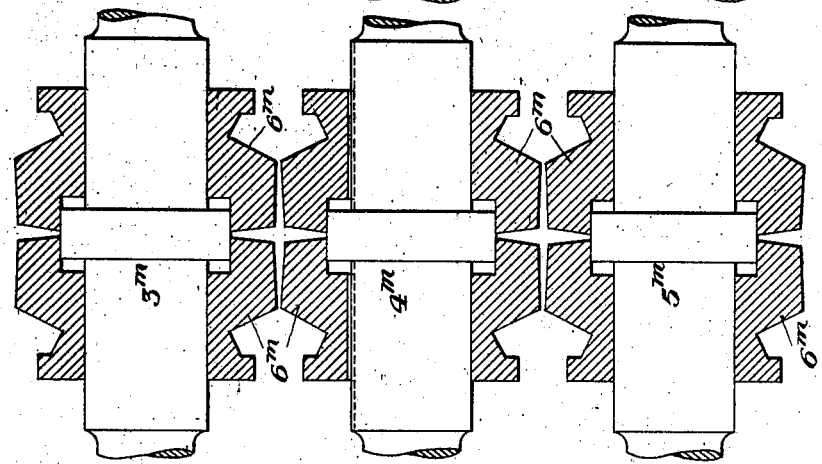
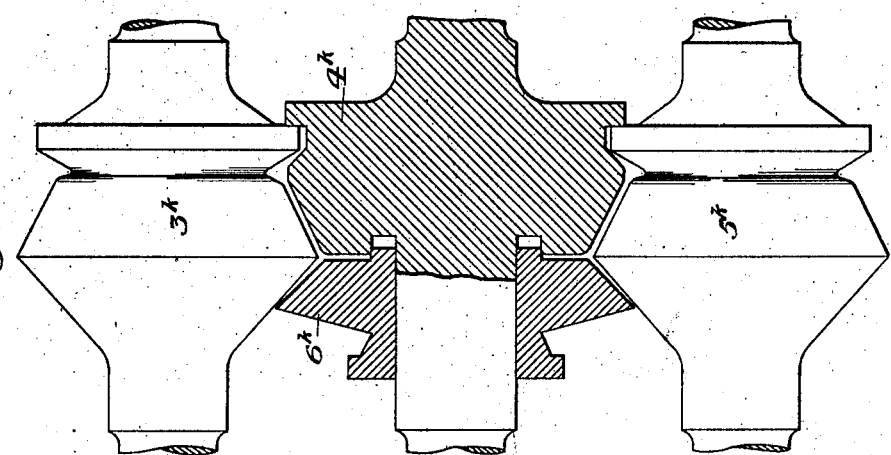

UNITED STATES PATENT OFFICE.

GEORGE H. BARBOUR, OF PITTSBURGH, PENNSYLVANIA.

ROLLING-MILL.

1,078,240.   Specification of Letters Patent.   Patented Nov. 11, 1913.

Application filed November 13, 1909. Serial No. 527,318.

*To all whom it may concern:*

Be it known that I, GEORGE H. BARBOUR, of Pittsburgh, county of Allegheny, and State of Pennsylvania, have invented a new and useful Improvement in Rolling-Mills, of which the following is a full, clear, and exact description, reference being had to the accompanying drawings, forming part of this specification, in which—

Figure 1 is an end view partially in section of a three-high mill with one form of my improved apparatus attached, showing the semi-finishing pass for rolling a beam; Fig. 2 is a sectional view through the three rolls, forming the finishing passes for a beam; Figs. 3, 4 and 5, are sectional views showing respectively the roughing, semi-finishing and finishing rolls of a modified form for rolling a beam; Fig. 6 is a similar view of a modified form of rolls showing another semi-finishing pass for a beam; Fig. 7 is a sectional view through roughing rolls adapted to roll a channel beam; Fig. 8 is a sectional view of the rolls for the semi-finishing passes for rolling a channel beam, showing a different arrangement of rolls; Fig. 9 is a sectional view through the rolls forming the semi-finishing passes for rolling T sections; Fig. 10 is a similar view of finishing rolls for rolling T sections; Fig. 11 is a similar view of rolls for rolling deck beams; Fig. 12 is another modified form of rolls for rolling a four pointed star section; Fig. 13 is a similar view of rolls, forming the finishing pass for dwelling house sections.

This invention relates to an apparatus for rolling beams, girders and structural steel or iron shapes generally.

The object of my invention is to provide a cheap and efficient apparatus in which sections of varying depth, varying thickness of flanges or varying weight per yard for the same length of web and length of flange may be rolled with one set of rolls.

Another object is to obviate the necessity of changing the rolls when similar sections of different dimensions are to be rolled. This is accomplished by providing one or more of the rolls with a collar or collars which are adjustable longitudinally on said roll, and which are arranged to form one of the flanges of the section to be rolled.

The precise nature of my invention will be best understood by reference to the accompanying drawings, which will now be described, it being premised, however, that various changes may be made in the details of construction and general arrangement of the parts, without departing from the spirit and scope of my invention as defined in the appended claims.

Referring to Fig. 1, of the drawings, the numeral 2 designates housings which are adapted to receive the rolls 3, 4 and 5 of a three high mill, the rolls 3 and 5 may be adjusted to and from the roll 4 by the usual and well known adjusting mechanism. Mounted on the necks of the roll 4 and on each side thereof are the collars 6, which collars may be loosely mounted so as to rotate freely on the shaft of said roll, or they may be splined so as to positively rotate therewith in a similar manner to the collar shown in Figs. 4 to 12, while capable of longitudinal adjustment thereon. These collars are provided with recesses 8 on their inner faces and are adapted to receive the ends of the roll, the collars forming the ends of the pass between the rolls 3 and 4, and 4 and 5. Each collar is also provided with a groove 9 and a flange 10 on the outer end thereof. 11 is a frame, which is adapted to receive the flange 10 on the end of one of the collars 6, and 22 are anti-friction rollers, or balls in the frame 11, and are adapted to reduce to a minimum the friction caused by the thrust on the collars 6. 12 is a plate preferably formed in two half sections which is secured to the inner face of this frame and engages the inner edge of the flange 10. The collars 6 are moved longitudinally along the spindles of the roll 4 by means of the frames 11. Each of these frames has connected thereto a plurality of screw rods $11^a$ which pass through openings in the housing and also through screw threaded openings in the pinions $11^b$, which pinions are rotatably mounted in a frame $11^c$ connected to the housing. $11^d$ is a gear wheel which is in mesh with the pinions $11^b$, and connected to this gear wheel $11^d$ is a bevel gear $11^f$, which is in mesh with the bevel gear $11^g$ on the vertical shaft $11^h$ journaled in bearings supported by the housing. In Fig. 1 I have shown only one of the shafts $11^h$, the shaft on the other side corresponding to this shaft $11^h$ being in advance of the point through which the section is taken. Connected to the lower end of each of these shafts $11^h$ is a bevel gear $11^j$, which is in mesh with the pinions on a transverse shaft $11^i$, one of which has been indicated at $11^k$. When the shaft $11^l$ is rotated the frames 11 will be moved along the spindles of the roll 4 through the medium of the mechanism just described, and which frames will in turn move the collars 6 to vary the width of the flanged groove. The rolls 3 and 4 together with the collar 6 on the roll 4 form the pass between these two rolls; and the rolls 4 and 5, together with the collars 6 on the roll 4 form the pass between the rolls 4 and 5. These collars form the ends of the passes, and by moving the rolls 3 and 5 to and from the rolls 4, the thickness of the web of the beam can be varied, and by moving the collar 6 on the shaft of the rolls 4, the thickness of the flanges can be varied.

I have shown removable bushings secured to the collars 6 and to the roll 4, the bushings attached to the roll 4 are designated by the numerals 13, and the bushings attached to the collars 6 are designated by the numerals 14. The bushings 13 are secured to the roll 4 by means of the keys 15, and the bushings 14 are secured to the collars 6 by the screws or bolts 16. By removing the bushings 13 and 14 from the roll and collars, and inserting bushings of different sizes, the length of the flanges of the beam can be varied.

The rolls 3 and 5 are mounted in the housings 2 so as to permit them to be moved toward and from the roll 4.

23 and $23^a$ designate screws mounted in nuts 24 and $24^a$ in the bottom and top portions respectively of the housing 2. Connected to these screws are gear wheels 25 and $25^a$ respectively, which mesh with pinions 26 and $26^a$ respectively on a shaft 28, which is driven by a shaft 29 through the medium of the bevel gearing 27. By rotating the shaft 29 in one direction, the rolls 3 and 5 will be moved toward the roll 4, and when rotated in the opposite direction the rolls 3 and 5 will be moved away from the roll 4.

In Fig. 2, I have shown the rolls for the finishing passes, the same reference numerals have been applied to the various parts, with the letter $a$ affixed.

In Figs. 3, 4 and 5, I have shown a different arrangement of rolls for rolling beams. In Fig. 3, in which I have shown the roughing rolls, I have used the same reference letters with the letter $c$ added to designate the various parts. In this arrangement, each of the rolls is provided with one adjustable collar which is adapted to be adjusted along the shaft of the roll to vary the thickness of the flange of the beam, and by moving the rolls $3^c$ and $5^c$ to and from the roll $4^c$ the thickness of the web of the beam can be varied. In Fig. 4, I have shown a semi-finishing pass for rolling a beam and in this variation the rolls $3^d$, $4^d$ and $5^d$ are splined so as to be capable of a longitudinal movement on their shafts and are also provided with flanges $10^d$ at one end, which may be engaged by a frame similar to the frame 11 for moving the collar 6. In this form, each of the shafts is also provided with a collar $6^d$, which is capable of adjustment on the shaft. In Fig. 5, I have shown a finishing pass for a beam in which each of the members is designated by the same numeral, with the letter $e$ affixed, and in this case, I have also shown a movable collar $6^e$ mounted on the shaft of each of the rolls. In the construction, shown, in Figs. 3, 4 and 5, the friction on the ends of the beam is equalized as one of the collars is placed on each of the rolls forming the pass.

In Fig. 6, I have illustrated another variation which is similar to Fig. 2, in which the same numerals are used with the letter $f$ affixed. In this construction, the collars 6 are provided with a flange, which enters grooves or recesses 8 formed in each side of the roll, and which grooves perform the same function as the recess 8 in the collar of Fig. 1.

In Figs. 7 and 8, I have shown the roughing and semi-finishing rolls for a channel section and in which I have used the same reference numerals with the letters $g$ and $h$, respectively, affixed, thereto. In Fig. 7, I have shown the collars $6^g$, engaging the roll $4^g$, and in Fig. 8, I have shown an arrangement in which the collar $6^h$ is movable upon the shaft of the roll $4^h$, and the rolls $3^h$ and $5^h$ are movably mounted on their shaft. Formed integrally with one end of the shaft of each of these rolls $3^h$ and $5^h$ is a flange 17. In this case, the collar $6^h$ as well as the rolls $3^h$ and $5^h$ are moved in the same direction in order to vary the thickness of the flanges of the channel.

In Figs. 9 and 10, I have shown the semi-finishing and finishing rolls, for rolling T's, and in which I have shown an upper and lower roll 18 and 19, and $18^a$ and $19^a$, respectively, and a middle roll 20 and $20^a$, which is provided with two movable collars $6^j$, and by moving these collars, the thickness of the central flange of the T can be varied, while by moving the rolls 18 and 19 to and from the roll 20, the thickness of the main flange may be varied. I have not shown the roughing rolls for rolling a T section, but this will be readily understood by those familiar with the art.

In Fig. 11, I have shown a set of rolls for rolling deck beams, in which each of the parts are designated by the same numeral with the letter $k$ affixed. In this case, it is only necessary to use a single collar $6^k$ which is movable on the shaft of the roll $4^k$.

In Fig. 12, I have shown a set of rolls for rolling a four pointed star, in which $3^m$, $4^m$ and $5^m$ designate the rolls, each of which is provided with two adjustable collars $6^m$, similar to the collars $6^j$, shown in Fig. 10, and by separating the rolls and adjusting the collars thereon, the thickness of the flanges of the section may readily be varied.

In Fig. 13, I have shown the rolls for the finishing passes for rolling dwelling house sections. In this construction, the rolls $3^n$ and $5^n$ are adjustable toward and away from the roll $4^n$. Mounted on the shaft of each of these rolls is a collar $6^n$, and which are arranged for longitudinal adjustment along the shafts on which they are mounted. These collars may be loosely mounted on the shafts of the rolls or they may be splined thereto. I prefer to spline the collar on the shaft of the roll $4^n$ thereto and allow the collars on the shafts of the rolls $3^n$ and $5^n$ to be driven by frictional contact with the section being rolled.

The advantages of my invention result from the provision of a longitudinally adjustable collar or collars on the rolls of a rolling mill, which collars are arranged to form the flanges of the sections to be rolled, and by the adjustment of which the dimensions of the flange may readily be varied.

With my arrangement the collars forming the flanges of various sections may be frictionally driven by the flanges of the section being rolled and can therefore rotate at the mean speed of the flange forming face of the collar with relation to the speed of the body of the section. By this arrangement the tearing of the fiber of the metal along the flanges of the section, due to the improper speed of the flange forming portion of the pass, is greatly reduced.

I claim:

1. A metal shaping device, having a pair of housings, rolls mounted in said housings, a collar mounted on one of the rolls and adjustable longitudinally with relation thereto, said collar being arranged to form a part of the pass, and collar adjusting mechanism on the housing; substantially as described.

2. In a rolling mill for rolling flanged shapes, comprising a pair of housings, a plurality of rolls mounted in the housings, collars adjustably mounted on one of said rolls, said collars being arranged to form parts of the flange grooves of the pass, and collar adjusting mechanism, mounted in the housing and arranged to adjust the collars irrespective of the rolls; substantially as described.

3. In a mill for rolling flanged shapes, comprising a pair of housings, three rolls mounted in said housings, collars adjustably mounted on the central roll, said collars being arranged to form a portion of the flange grooves of the pass, and a collar adjusting mechanism mounted on said housings for moving the collars toward and from each other to vary the width of the flange groove passes; substantially as described.

4. In a rolling mill for rolling flanged shapes, comprising a pair of housings, three rolls journaled in said housings, a collar adjustably mounted on the central roll, said collar being arranged to form a portion of both of the flange passes between adjacent rolls, and collar adjusting mechanism on the frame for adjusting the collar longitudinally along said roll to vary the width of the flange pass; substantially as described.

5. A rolling device having a pair of housings, rolls mounted in the housings, a collar on one of the rolls, and means on the housings for adjusting the collar longitudinally of the roll; substantially as described.

6. In a rolling mill for rolling flanged shapes, having a frame, a roll mounted in the frame, a collar adjustably mounted on the roll and arranged to vary the width of the flange groove, the collar being arranged to form a part of the pass, screws mounted in the frame for adjusting the collar, and gearing for actuating the screws; substantially as described.

7. In a rolling mill, a pair of rolls, a flange forming collar mounted on one of said rolls, a bushing in said collar, a removable bushing secured to the roll on which said collar is mounted and arranged to coact with the bushing on the collar, and means for adjusting the collar on the roll; substantially as described.

8. A rolling mill for rolling flanged shapes, having a frame, a pair of rolls mounted in the frame, a collar mounted on the shaft of one of the rolls and capable of rotation about the axis thereof, means mounted on the frame for moving the rolls toward and away from each other, and means for moving the collar along the roll to vary the width of the flange groove of the pass; substantially as described.

9. A rolling mill having a frame, a pair of rolls mounted in the frame, a flange forming collar mounted on one of said rolls, a frame in which the collar is seated, means for moving the collar frame mounted in the mill frame and connected to the collar frame, roll-adjusting mechanism, actuating mechanism mounted on the main frame for moving the adjusting mechanism, and antifriction bearings between the collar and its frame; substantially as described.

10. A rolling mill having a frame, a pair of rolls mounted in the frame, a flange forming collar mounted on one of said rolls, and antifriction roll frame on which the collar is seated, and means on the frame for adjusting the collar frame on the roll for varying that portion of the pass formed by the collar; substantially as described.

11. A rolling mill having a frame, a pair of rolls mounted in said frame, a collar mounted on the shaft of one of the rolls and capable of rotation about the axis thereof, a frame in which the collar is seated, anti-friction thrust bearings on the frame for the collar, screws mounted in the main frame and engaging the collar frame for adjusting the position of the collar, and gearing on the mill frame for actuating the screws; substantially as described.

12. A metal shaping device having a pair of housings, a plurality of rolls journaled in said housings, collars mounted on said rolls and adjustable longitudinally with relation thereto, said collars being arranged to form part of the pass between the rolls, and collar adjusting mechanism upon the housings; substantially as described.

In testimony whereof, I have hereunto set my hand.

GEORGE H. BARBOUR.

Witnesses:
 JESSE B. HELLER,
 H. M. CORWIN.